(12) United States Patent
Tabata et al.

(10) Patent No.: US 8,694,919 B2
(45) Date of Patent: Apr. 8, 2014

(54) MENU DISPLAY DEVICE, METHOD FOR DISPLAYING MENU, AND IMAGING APPARATUS

(75) Inventors: Kazumasa Tabata, Osaka (JP); Takuma Masuda, Osaka (JO)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 12/644,474

(22) Filed: Dec. 22, 2009

(65) Prior Publication Data

US 2010/0169835 A1  Jul. 1, 2010

(30) Foreign Application Priority Data

Dec. 24, 2008  (JP) ................................. 2008-326927

(51) Int. Cl.
*G06F 3/048* (2013.01)
*G06F 3/01* (2006.01)

(52) U.S. Cl.
USPC ........... 715/823; 715/843; 715/864; 715/810; 345/419; 345/173; 345/810

(58) Field of Classification Search
USPC ................... 715/810, 864, 823, 844; 345/173
See application file for complete search history.

(56) References Cited

U.S. PATENT DOCUMENTS

| 7,142,890 B2 | 11/2006 | Irimajiri et al. | |
| 2003/0206199 A1* | 11/2003 | Pusa et al. | 345/794 |
| 2004/0027473 A1 | 2/2004 | Suzuki | |
| 2005/0091596 A1* | 4/2005 | Anthony et al. | 715/712 |
| 2007/0126877 A1* | 6/2007 | Yang | 348/207.99 |
| 2007/0252804 A1* | 11/2007 | Engel et al. | 345/98 |
| 2008/0194326 A1* | 8/2008 | Brunet De Courssou et al. | 463/31 |

FOREIGN PATENT DOCUMENTS

| JP | 10-214172 A | 8/1998 |
| JP | 2002-140144 A | 5/2002 |
| JP | 2004-023415 A | 1/2004 |

OTHER PUBLICATIONS

"Machine translation of Japanese application JP10214172", Ogawa Masayuki.*

* cited by examiner

*Primary Examiner* — Amy Ng
*Assistant Examiner* — Toan Vu
(74) *Attorney, Agent, or Firm* — Hamre, Schumann, Mueller & Larson, P.C.

(57) ABSTRACT

The menu display device of the present invention includes: a display section 182 configured to display selectable menu items in a plurality of lines; a menu item selector 184 configured to select one of the menu items; and a control section 170 configured to execute a control so that when the menu item is selected by the menu item selector 184, the plurality of lines are displayed overlapped with each other and the line including the selected menu item is displayed at a forefront, and a selection item corresponding to the selected menu item is displayed under the selected menu item.

14 Claims, 13 Drawing Sheets

MENU DISPLAY DEVICE, METHOD FOR DISPLAYING MENU, AND IMAGING APPARATUS

BACKGROUND OF THE INVENTION

1. Field of the Invention

The present invention relates to a menu display device for displaying a plurality of menu items. Particularly, the present invention relates to a menu display device capable of displaying many menu items on a small display section. The present invention also relates to an imaging apparatus using the menu display device.

2. Description of Related Art

A digital video camera includes a liquid crystal display section with a screen that can be checked while picking up images. Also, the liquid crystal display section displays various operating informations. While checking the various operating informations displayed on the liquid crystal display section, a user performs a button operation and makes settings for the operating informations.

JP 2004-23415 A describes a digital camera including a display for displaying menus shown in FIGS. 8A, 8B and 8C. Specifically, whichever of the menus divided into 3 groups from the functional particulars of the digital camera is displayed on the menu display screen 2 of the display 3 by designating the tabs 1a-1c using the left-right key 16 (16a and 16b), and the setting on functional condition values is conducted corresponding to the chosen functional particular from the displayed menu. In this instance, in the following process: (i) choosing and designating operation which is operated by the operation of the up-down key 15 (15a and 15b) corresponding to the functional particulars 7a-7e, 10a-10e and 12a-12c of group of menu chosen and displayed on the display 3; (ii) choosing and designating operation of the functional particulars by operation of the OK key 17; (iii) displaying operation of the functional condition values 8a-8e, 11a-11e, 13a-13c by operation of the OK key 17 corresponding to the functional particulars that are chosen and designated; (iv) choosing and designating operation by the up-down key 15 for the functional condition values which have been displayed; and (v) designating operation by the OK key 17 corresponding to the functional condition values that are chosen and designated, it is possible to choose the tabs 1a-1c independently and arbitrary by operation of the left-right key 16. On the menu display screen 2 the menu of the group that is chosen will be displayed soon after the tabs 1a-1c have been chosen. Various settings can be made for the functional particulars by easy operations using the up-down key 15, the left-right key 16, and the OK key 17 without operation mistakes.

SUMMARY OF THE INVENTION

The display section of a digital video camera is composed of a touch panel (touch screen) in some cases. In order to make it easy to select an item on the touch panel, the display sizes of the selectable items need to be large to some extent. However, a larger display size of the item limits the number of the items that can be displayed in the screen.

The present invention is intended to provide a menu display device that can display more items, each having a large display size.

More specifically, the present invention provides a menu display device including:

a display section configured to display selectable menu items in a plurality of lines;

a menu item selector configured to select one of the menu items; and a control section configured to execute a control so that when the menu item is selected by the menu item selector, the plurality of lines are displayed overlapped with each other and the line including the selected menu item is displayed at a forefront, and a selection item corresponding to the selected menu item is displayed under the selected menu item.

In another aspect, the present invention provides a method for displaying a menu, including the steps of displaying selectable menu items in a plurality of lines on a display section;

selecting one of the menu items; and displaying the plurality of lines so as to be overlapped with each other and displaying the line including the selected menu item at a forefront while displaying selection items corresponding to the selected menu item under the selected menu item, when one of the menu items is selected.

In still another aspect, the present invention provides an imaging apparatus including the menu display device of the present invention. The imaging apparatus is operated in accordance with a content of a setting determined by a user using the menu display device.

With the above-mentioned configuration, it is possible for the present invention to display more items on a display section when displaying menu items, each having a large size, and their selection items on the display section. As a result, the items can be selected more effectively.

DETAILED DESCRIPTION OF THE INVENTION

In a preferable configuration, a display section displays a plurality of menu items indicating different contents from each other. The menu items are arranged in lateral and longitudinal directions of a screen so that a user can recognize all of the menu items visually. When one of the menu items is selected by the menu item selector, the control section executes, using the display section, a display control including processes of (i) displaying the plurality of menu items in the lines overlapped with each other in an upper area of the screen while displaying, at the forefront on the screen, the selected menu item together with the other one or more menu items included in the same line as the line of the selected menu item, so that the menu items included in the other one or more lines are interrupted by the selected menu item and the other one or more menu items included in the same line as the line of the selected menu item; and (ii) displaying a plurality of the selection items belonging to the selected menu item under the selected menu item so as to be associated with the selected menu item.

Hereinafter, an embodiment in which the menu display device of the present invention is applied to a video camera will be described in detail using the drawings.

Embodiment 1

1. Configuration

Figure 1:
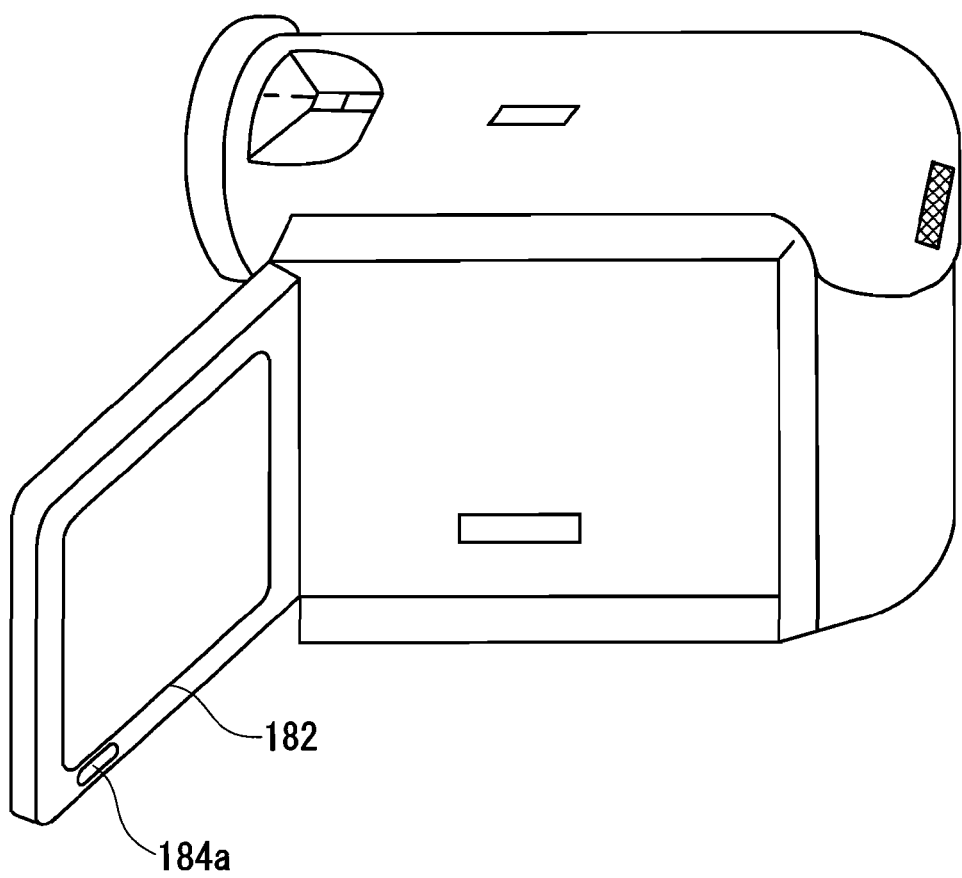
FIG. 1 is a view showing an appearance of a video camera using a menu display device according to an embodiment of the present invention.

FIG. 1 is a view showing an appearance of an imaging apparatus using the menu display device of the present invention. As the imaging apparatus, a video camera and a digital camera can be mentioned. In Embodiment 1, a video camera is described. A video camera 101 includes a touch panel 182 (touch screen) as a display section (a menu display section) constituting the menu display device. The touch panel 182 is attached to the video camera 101 so as to be opened/closed freely. For reducing the power consumption, the touch panel 182 displays no picked-up images, etc. when closed, and starts displaying them when opened.

(1-1. Configuration of the Video Camera)

Figure 2:
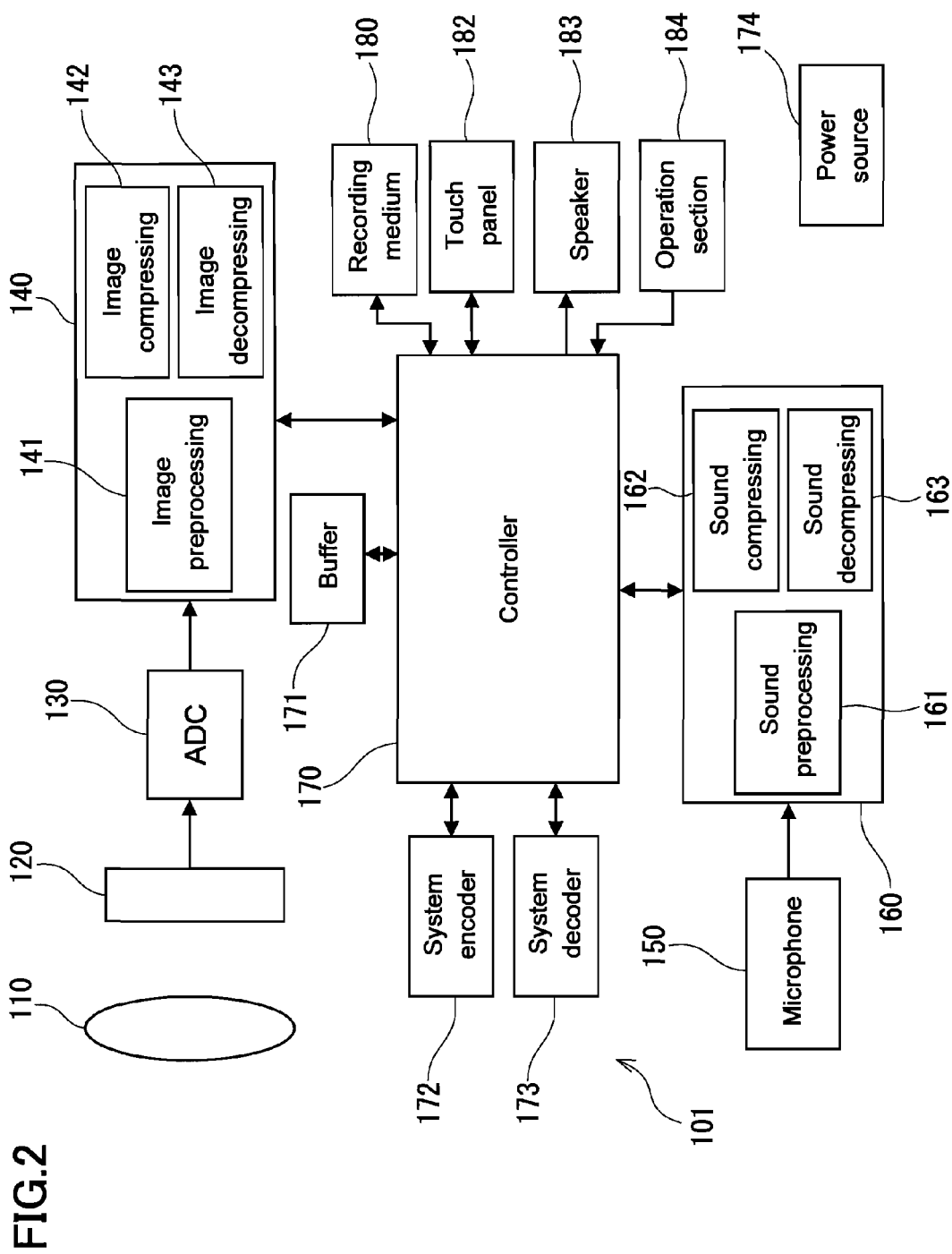
FIG. 2 is a block diagram showing a configuration of the video camera according to the embodiment of the present invention.

FIG. 2 is a block diagram showing a configuration of the video camera 101 according to the embodiment of the present invention. The video camera 101 includes an optical system 110, an image pickup element 120, an ADC (Analog-Digital Converter) 130, an image processing section 140, a controller 170, a buffer 171, a microphone 150, a sound processing section 160, a system encoder 172, a system decoder 173, a recording medium 180, the touch panel 182, a speaker 183, an operation section 184, and a power source 174. Not all of these elements are necessarily essential in carrying out the present invention. FIG. 2 merely shows a typical configuration of the video camera 101. Hereinafter, the configuration of the video camera 101 will be described in detail.

The video camera 101 picks up an image of a subject formed by the optical system 110, using the image pickup element 120. The image processing section 140 executes various image processing on the image data generated by the image pickup element 120. The sound processing section 160 executes various sound processing on the sound data collected by the microphone 150. The image data processed by the image processing section 140 and the sound data processed by the sound processing section 160 are subject to a system encoding process by the system encoder 172, and stored in the recording medium 180. Among the AV data (audio visual data) stored in the recording medium 180, etc., the image data can be displayed on the touch panel 182 and the sound data can be outputted from the speaker 183.

The optical system 110 includes an object lens, a zoom lens, an aperture, an OIS unit (an Optical Image Stabilizer unit), a focus lens, etc. The optical system 110 forms the image of the subject by collecting light from the subject.

The image pickup element 120 generates image data by picking up the image of the subject formed by the optical system 110. Typically, the image pickup element 120 is composed of a CMOS image sensor (a Complementary Metal-Oxide Semiconductor image sensor) or a CCD image sensor (a Charge-Coupled Device image sensor). The ADC 130 converts the image data generated by the image pickup element 120 from analog signals into digital signals.

The image processing section 140 executes various processing on the image data converted by the ADC 130. The image processing section 140 generates image data to be inputted to the system encoder 172 and image data to be displayed on the touch panel 182. Moreover, the image processing section 140 generates the image data to be displayed on the touch panel 182 and image data to be inputted again to the system encoder 172, by processing image data outputted from the system decoder 173. The image processing section 140 can be composed of a DSP (a digital signal processor) or a microcomputer.

More specifically, the image processing section 140 includes an image preprocessing section 141, an image compressing section 142, and an image decompressing section 143. The image preprocessing section 141 executes various image processing, such as gamma correction and white balance correction, on the image data converted into digital signals by the ADC 130 so as to generate processed image data.

The image compressing section 142 compresses the image data using a technique, such as DCT (Discrete Cosine Transform), Huffman coding, and inter-frame prediction. As the method for compressing moving image data, there can be mentioned MPEG-2 (Moving Picture Experts Group Phase 2) and H.264/AVC (Advanced Video Cording), for example. As the method for compressing still image data, JPEG (Joint Photographic Experts Group) and GIF (Graphics Interchange Format) can be mentioned, for example. However, the compressing method in the present invention is not limited to these.

The image decompressing section 143 decodes the image data into an uncompressed state when the compressed image data outputted from the system decoder 173 is reproduced by the touch panel 182.

The microphone 150 collects sound and generates sound data. In order to handle the inputs of stereo sound and multichannel sound, the microphone 150 may be composed of a plurality of microphones.

The sound processing section 160 executes various processing on the sound data of the microphone 150. The sound processing section 160 generates sound data to be inputted to the system encoder 172 and sound data to be outputted to the speaker 183. The sound processing section 160 executes a sound processing on sound data to be outputted from the system decoder 173 so as to generate the sound data to be outputted to the speaker 183 and sound data to be inputted again to the system encoder 172. The sound processing section 160 can be composed of a DSP or a microcomputer.

More specifically, the sound processing section 160 includes a sound preprocessing section 161, a sound compressing section 162, and a sound decompressing section 163. The sound preprocessing section 161 converts the analog sound data collected by the microphone 150 and generates digital signal sound data. In addition, the sound preprocessing section 161 executes various sound processing such as generations of stereo sound and multichannel sound.

The sound compressing section 162 compresses the sound data using a compression format in compliance with AC 3 (Audio Code number 3), AAC (Advanced Audio Coding), etc. However, the compression format in the present invention is not limited to these.

When the speaker 183 outputs sounds based on the compressed sound data outputted from the system decoder 173, for example, the sound decompressing section 163 decodes this sound data into an uncompressed state.

The system encoder 172 generates AV data to be recorded on the recording medium 180 by multiplexing the compressed image data outputted from the image processing section 140 and the compressed sound data outputted from the sound processing section 160.

The system decoder 173 decodes the AV data recorded on the recording medium 180, and generates compressed image data and compressed sound data. The system decoder 173 outputs the generated compressed image data to the image decompressing section 143, and the compressed sound data to the sound decompressing section 163, respectively.

The controller 170 is a control means for controlling the entire video camera 101. A function to be provided by the controller 170 can be realized by combining a hardware, such as a DSP, with a software including a control program to be executed by the hardware.

The buffer 171 functions as a working memory for the controller 170. The buffer 171 can be made of, for example, DRAM (Dynamic Random Access Memory), a ferroelectric memory, or the like.

The recording medium 180 is composed of a memory card using a nonvolatile memory such as a flash memory and a ferroelectric memory, a hard disk, an optical disc, or the like. Various data, such as AV data, sound data, and image data can be stored in the recording medium 180.

The touch panel 182 is a combination of a liquid crystal display and a locator. The touch panel 182 can display images based on the image data generated by the image pickup element 120, and images based on the image data in the AV data read out from the recording medium 180. Furthermore, the touch panel 182 can display various setting information, recording duration, etc. of the video camera 101. When a user touches an area where a menu, etc. is displayed, the touching is sensed, and the positional information of the touched area is outputted from the touch panel 182 to the controller 170. The controller 170 specifies the operation selected by the user based on the content displayed on a screen and the positional information of the touched area. As the method for operating the touch panel 182, there can be mentioned a resistance film method, a surface acoustic wave method, etc. and any of these may be used.

The speaker 183 can output sounds based on the sound data collected by the microphone 150 and sounds based on the sound data in the AV data read out from the recording medium 180.

The power source 174 supplies each part of the video camera 101 with the power necessary for operation. In a portable video camera, the power source 174 is a battery. The power source 174 is not limited to a battery, and may be an AC power source.

The operation section 184 is various operational instruments, such as a button and a cross key. The operation section 184 receives an order from a user and transmits the order to the controller 170. As shown in FIG. 1, a quick menu button 184a composing a part of the operation section 184 is provided on an outer frame of the touch panel 182. Pressing the quick menu button 184a switches the touch panel 182 to an initial screen for menu selection (FIG. 4A), as will be described later.

In the video camera 101, the menu items include "the number of recording pixels" and "interval recording", for example. As the selection items belonging to "the number of recording pixels", there can be mentioned "10 M", "8 M", "5 M", and "3.5 M." As the selection items belonging to "the interval recording", there can be mentioned "1 second", "10 seconds", "30 seconds", "1 minute" and "2 minutes." The interval recording is a function to reproduce a scene of a subject moving slowly taking a long time as a short-time moving image, by recording the scene at predetermined intervals. In this way, the number of selection items varies depending on the menu item.

(1-2. Correspondence Relationship Between the Configuration of the Present Invention and the Elements Shown in FIG. 2)

The touch panel 182 is an example of the display section as well as an example of the menu item selector of the present invention. More specifically, the display section and the menu item selector are composed of a touch panel display that allows a user to select among the menu items and make settings for the selection items by touching the menu items and the selection items displayed on the display section. Employing the touch panel 182 enhances the operativity of the video camera 101. The controller 170 is an example of the control section of the present invention, and executes various display controls using the touch panel 182. More specifically, the video camera 101 includes the menu display device composed of the touch panel 182 and the controller 170, and operates in accordance with the content of the setting determined by a user using the menu display device.

2. Operation

The video camera 101 displays the image data taken by the image pickup element 120 on the touch panel 182 when the touch panel 182 is opened. Thereafter, when a user performs an operation (pressing a touch panel operation start button, for example) to start an operation on the touch panel 182, the controller 170 displays the menu items so as to be superimposed on the image data. In the present embodiment, when a user presses the quick menu button 184a shown in FIG. 1, the selectable menu items are list-displayed on the touch panel 182. An operation that a user performs to select among the displayed menu items on the touch panel 182 will be described using the flow chart shown in FIG. 3, and screen transitions shown in FIGS. 4A to 4C and FIGS. 5A and 5B.

Figure 8A:
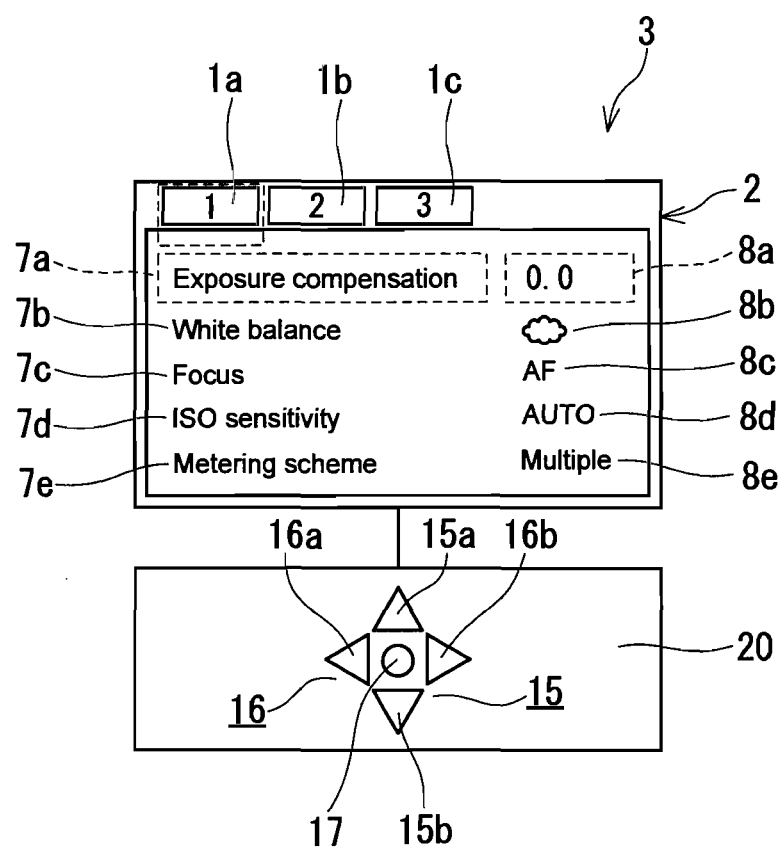
FIG. 8A is a schematic diagram showing an example of menu display in a conventional digital camera (when tab 1a is selected).
Figure 8B:
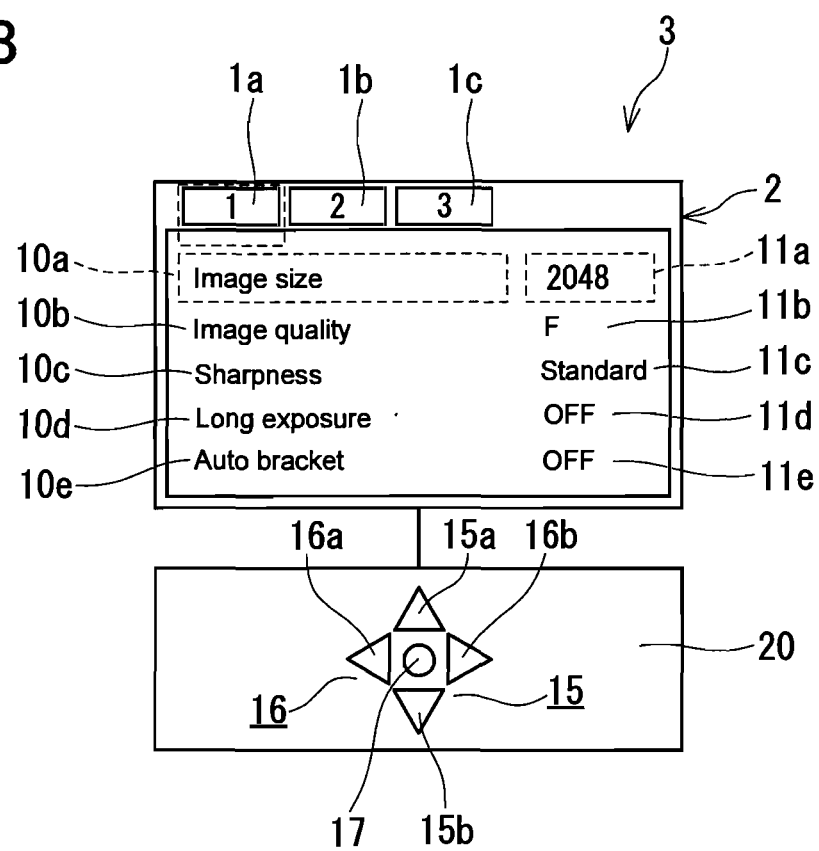
FIG. 8B is a schematic diagram showing an example of menu display in the conventional digital camera (when tab 1b is selected).
Figure 8C:
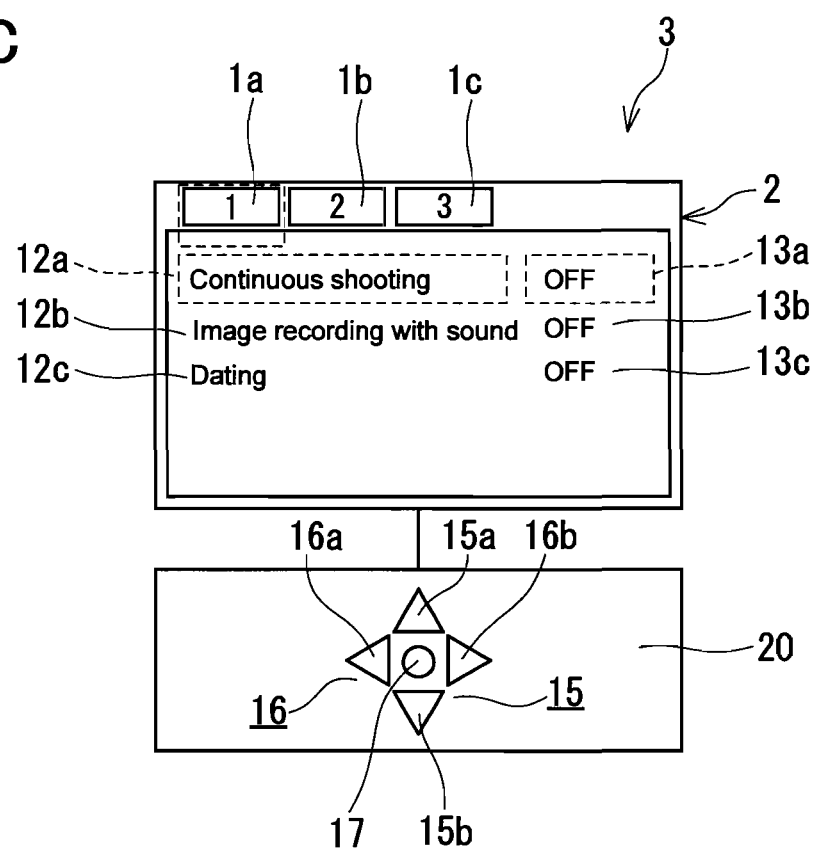
FIG. 8C is a schematic diagram showing an example of menu display in the conventional digital camera (when tab 1c is selected).

When the video camera 101 is portable, the touch panel 182 has a size in the range of 2.5 inches to 3.0 inches, for example. Thus, in the case of the conventional method described with reference to FIGS. 8A to 8C, the number of the menu items that can be displayed on one screen is limited. Although it is possible to display many menu items sequentially by scrolling the screen, it is necessary to find the menu item to be selected by a scrolling operation. Particularly, in recent years, a screen aspect ratio of 16:9 has become a mainstream for the display section of an imaging apparatus instead of a conventional screen aspect ratio of 4:3. Also in the present embodiment, the touch panel 182 has a screen aspect ratio of 16:9. With the screen aspect ratio of 16:9, the screen tends to have an insufficient length in its longitudinal direction, making the above-mentioned problem more noticeable. In contrast, the method of the present embodiment described hereinafter makes it possible to display many menu items on one screen so that a user can recognize these menu items at a glance without performing the scrolling operation. Thus, the operativity, convenience, and simplicity of the video camera 101 are enhanced. The present invention is not limited by the screen aspect ratio, and may employ a screen aspect ratio of 4:3.

Figure 4A:
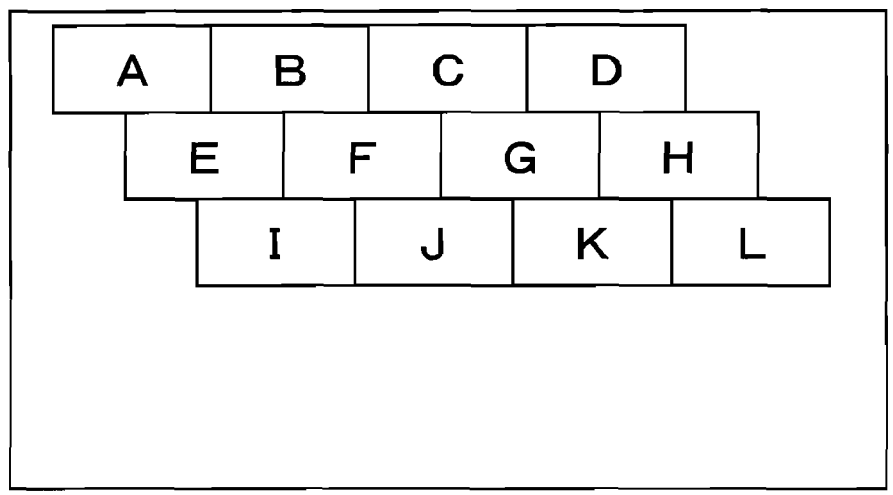
FIG. 4A is a view showing a screen of a touch panel before a menu item is selected.

FIG. 4A shows the screen of the touch panel 182 before a user selects among the menu items. A plurality of menu items A to L indicate different contents from each other. All of the menu items A to L are arranged and displayed regularly in the lateral and longitudinal directions of the screen so that a user can recognize them visually. In order to make it easy for the user to select among the menu items on the touch panel 182, each of the menu items A to L to be touched and selected by the user needs to have a certain size. When a selection is made among the menu items on the touch panel 182, the menu items in each of the lines are displayed so that their display positions are displaced from each other in the lateral direction, as shown in FIG. 4A.

In the present embodiment, each of the menu items A to L is indicated with an icon having a frame in which a content of the menu item is described with a character, a graphic, a symbol, or these in combination. The frame has a specified shape and size. When the menu items A to L are displayed in the plurality of lines on the touch panel 182, in order to allow display positions of the menu items included in one line to be staggered, with respect to the lateral direction of the screen, from display positions of the menu items included in another line adjacent to the one line, the icons composing the menu items included in the one line are displayed displaced from the icons composing the menu items included in the another line. Thereby, a user is less likely to select accidentally a menu item in the same row as the row including the menu item to be selected and in the line above or under the line including the menu item to be selected. More specifically, it is possible to prevent an operation mistake. The display positions of the menu items are not limited to the positions according to the above-mentioned method, and the menu items may be displayed without being displaced in the lateral direction.

All of the menu items of the video camera 101 do not necessarily have to be included in the menu items A to L. The menu items A to L may include only menu items used highly frequently by a user, such as menu items regarding an image pick-up function. When the quick menu button 184a shown in FIG. 1 is operated, only the particular menu items A to L specified beforehand are list-displayed on the touch panel 182.

Figure 3:
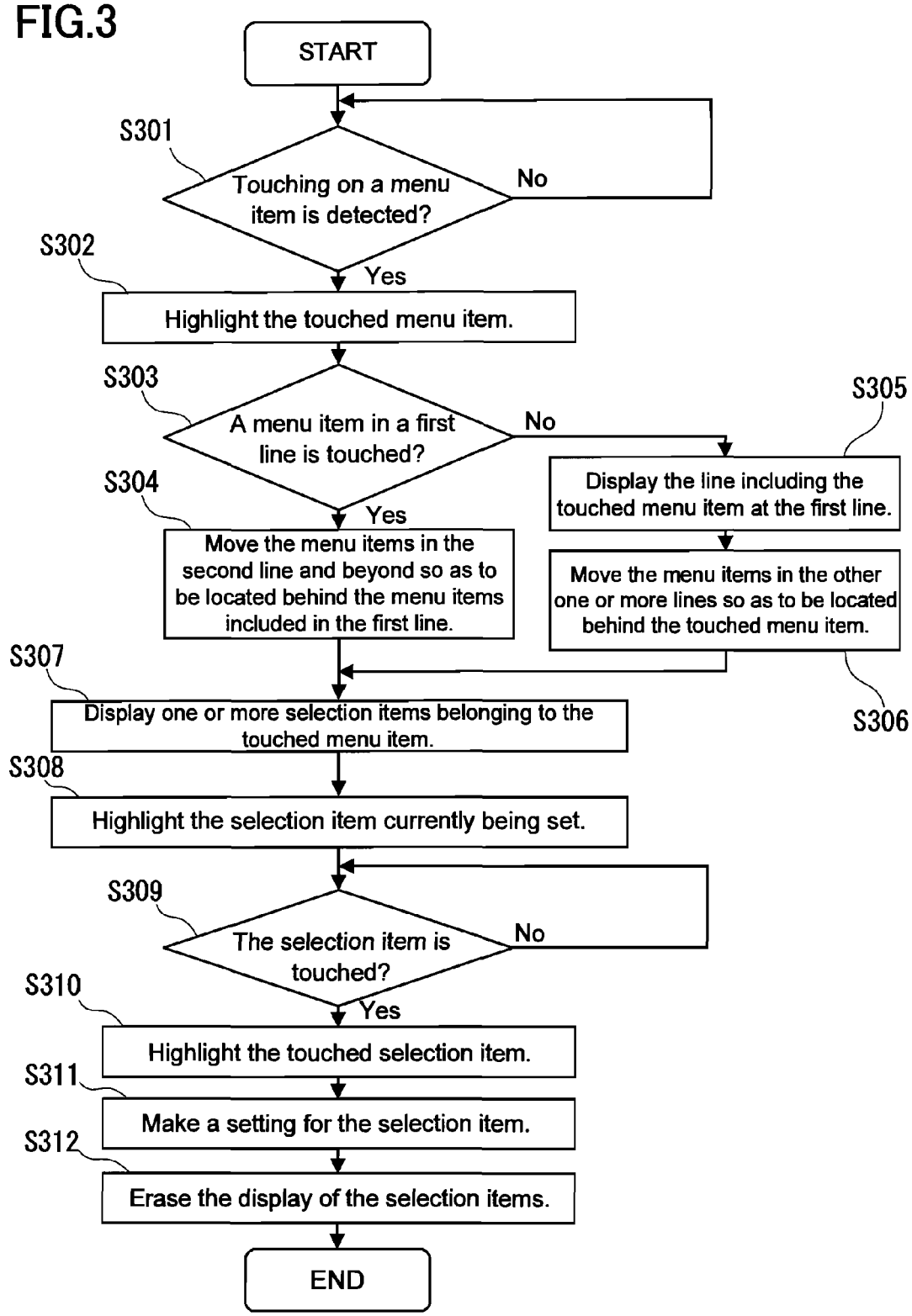
FIG. 3 is a flow chart showing an operation of the video camera according to the embodiment of the present invention.

As shown in FIG. 3, when a user touches one menu item displayed on the touch panel 182, the touch panel 182 transmits positional information of the touched area to the controller 170 (S301). The controller 170 detects which menu item was touched, based on the positional information of the menu items displayed on the touch panel 182 and the positional information of the touched area transmitted from the touch panel 182. Then, the controller 170 changes the display of the touched menu items (S302). As the method for changing the display, there can be mentioned a method in which the selected menu item is displayed in a frame with a different color from that of the frames of the other one or more menu items, and a method in which the color of the menu item itself is changed. More specifically, the selected menu item is highlighted so as to be distinguished from the other one or more menu items.

Figure 4B:
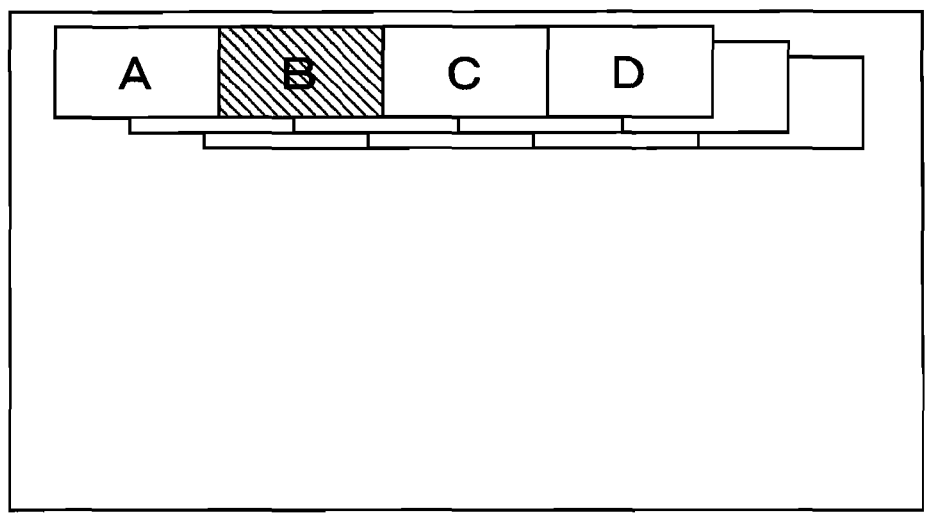
FIG. 4B is a diagram illustrating a change in the way of displaying menu items when a menu item in a first line is selected.
Figure 4C:
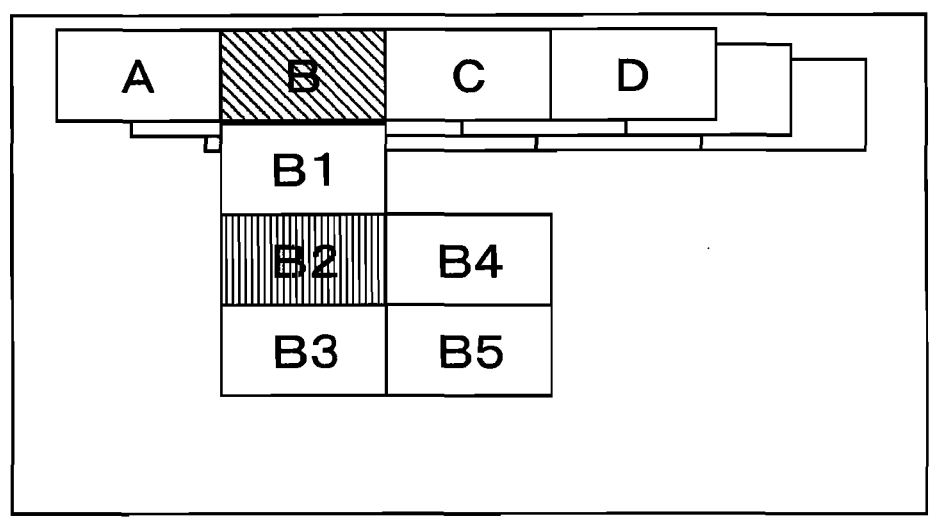
FIG. 4C is a diagram following FIG. 4B.
Figure 5A:
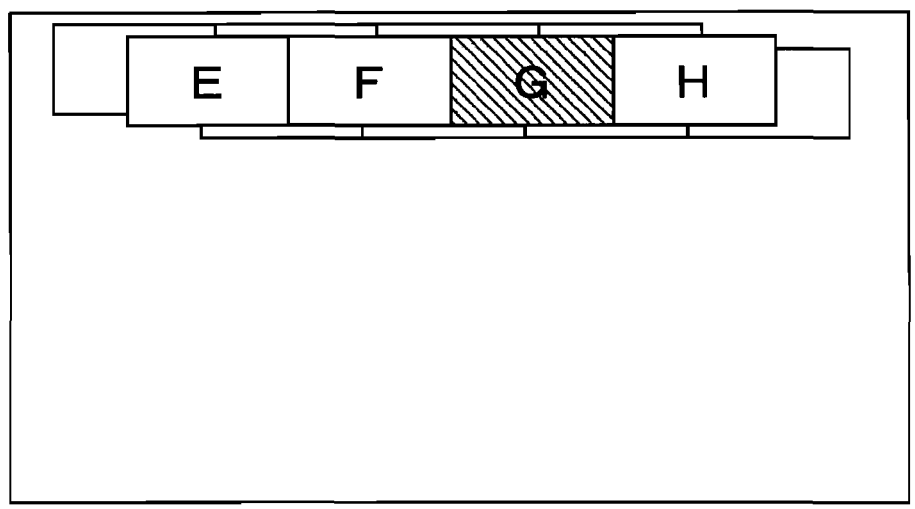
FIG. 5A is a diagram illustrating a change in the way of displaying the menu items when a menu item in a second line is selected.
Figure 5B:
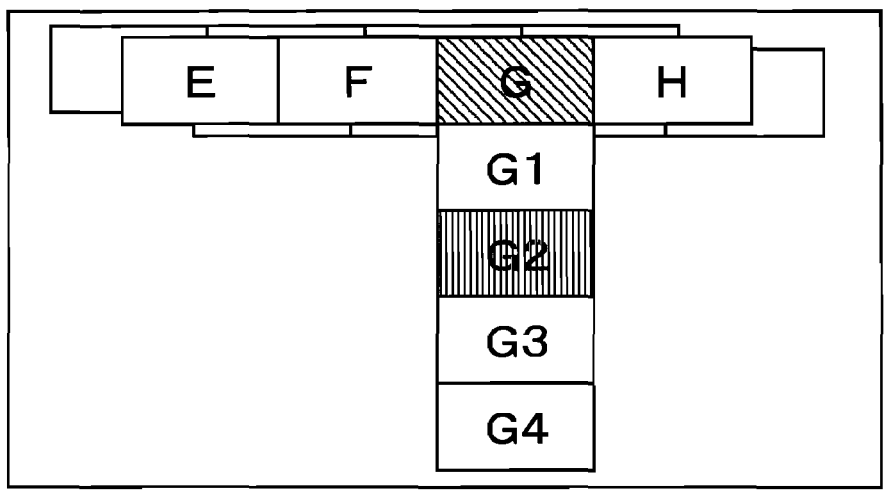
FIG. 5B is a diagram following FIG. 5A.

FIGS. 4B and 4C show a case where menu item "B" located in a first line is selected among the menu items A to L. FIGS. 5A and 5B show a case where menu item "G" located in a second line is selected among the menu items A to L.

As shown in FIG. 4B, when the selected menu item is displayed in the first line (Yes in S303), the controller 170 allows the menu items displayed in the second line and beyond to move behind the first line (S304). More specifically, when the line including the selected menu item is a line located uppermost with respect to the longitudinal direction of the screen, the menu items included in the other one or more lines are moved to an area where the menu items included in the other one or more lines are interrupted by the selected menu item and the other one or more menu items included in the same line as the line of the selected menu item, in Step S304. By performing such a process, it is possible to ensure a sufficient display space under the selected menu item.

In contrast, when the selected menu item is displayed in the second line (No in S303), the controller 170 allows the second line including the touched menu item to be displayed at the first line (S305), as shown in FIG. 4B. And the controller 170 allows the menu items in the other one or more lines to move behind the first line (S306). More specifically, when the line including the selected menu item is not a line located uppermost with respect to the longitudinal direction of the screen, the selected menu item and the other one or more menu items included in the same line as the line of the selected menu item are moved to an area where the selected menu item and the other one or more menu items included in the same line as the line of the selected menu item interrupt the menu items included in the line located uppermost with respect to the longitudinal direction of the screen, in Steps S305 and S306. Also, the controller 170 allows the menu items included in the line (a third line, for example) that is neither the line located uppermost with respect to the longitudinal direction of the screen nor the line including the selected menu item to move to a position where they are interrupted by the selected menu item and the other one or more menu items included in the same line as the line of the selected menu item. By performing such a process, it is possible to ensure a sufficient display space under the selected menu item.

As described above, the controller 170 executes the operation of displaying the plurality of menu items in the lines overlapped with each other in the upper area of the screen, while displaying, at the forefront on the screen, the selected menu item together with the other one or more menu items included in the same line as the line of the selected menu item, so that the menu items included in the other one or more lines are interrupted by the selected menu item and the other one or more menu items included in the same line as the line of the selected menu item. In the states shown in FIG. 4B and FIG. 5A, the user can recognize only the contents of the selected menu item and the other one or more menu items included in the same line as that of the selected menu item.

As shown in FIG. 4A, the presence and contents of all the menu items can be recognized visually when the menu items are list-displayed. However, when the menu items are displayed overlapped with each other completely, some of them cannot even be recognized to be present. This possibly deteriorates the convenience of the video camera 101. In the present embodiment, the menu items, including the selected one, are displayed displaced from each other with respect to the longitudinal direction of the screen even after the plurality of menu items are displayed in the lines overlapped with each other. The menu items are displayed displaced slightly from each other in the longitudinal and lateral directions even after one of the menu items is selected. Thus, all of the menu items can be recognized to be present.

Moreover, in the present embodiment, when one menu item is selected, the selected menu item is displayed in the first line (the uppermost line on the screen), and the menu items displayed in the other one or more lines are moved behind the first line. Thereby, even when the size of the menu item (the size of one icon) to be displayed is large with respect to the size of the screen, it is possible to ensure a sufficient space for displaying the selection items belonging to the selected menu item while displaying the selected menu item. As a result, more selection items can be displayed.

Thereafter, the controller 170 displays the selection items belonging to the selected menu item (S307). Specifically, one or more selection items belonging to the selected menu item are displayed under the selected menu item so as to be associated with the selected menu item. FIG. 4C shows a case where items of "B1", "B2", "B3", "B4" and "B5" are prepared as selection items that can be selected for menu item "B". FIG. 5B shows a case where "G1", "G2", "G3" and "G4" are prepared as selection items for menu item "G".

In the present embodiment, each of the selection items is indicated with an icon having a frame in which a content of the selection item is described with a character, a graphic, a symbol, or these in combination. The frame has the same shape and the same size as those of the frame of the menu item. In Step S307, a process of displaying the one or more selection items under the selected menu item by a pull-down method is executed. Specifically, the icon of the selected menu item is disposed adjacent to the icons of the selection items to be displayed thereunder in the longitudinal direction of the screen. Displaying the selection items by the pull-down method makes it possible to display many selection items collectively by using the space under the selected menu item effectively.

Figure 6:
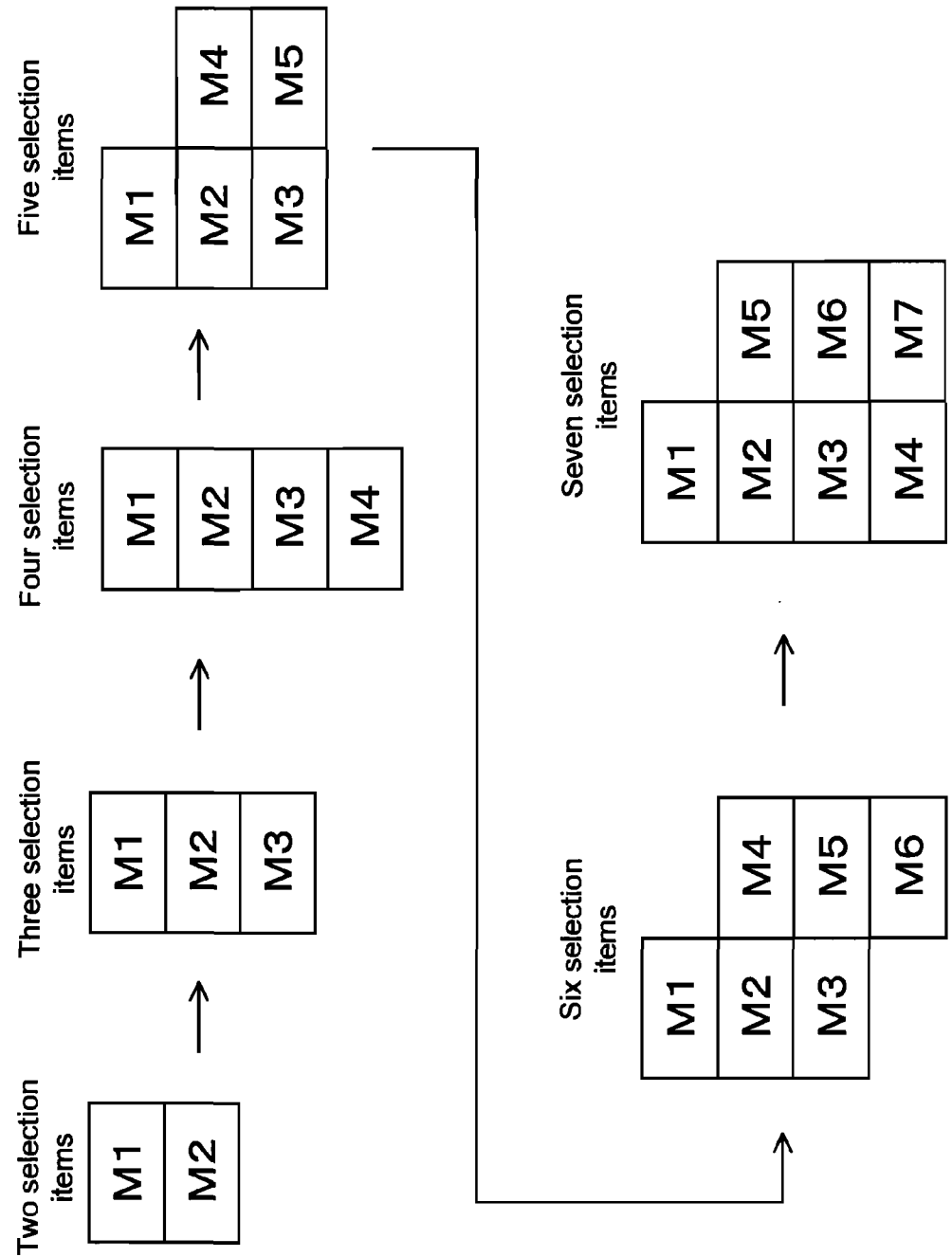
FIG. 6 is a diagram illustrating a change in the way of displaying selection items in accordance with the number of the selection items.

When displaying the one or more selection items under the selected menu item, the controller 170 changes the number of the lines and/or rows in which the selection items should be displayed, in accordance with the number of the selection items belonging to the selected menu item. FIG. 6 illustrates a change in the way of displaying the selection items in accordance with the number of the selection items. By changing the way of displaying the selection items in accordance with the number of the selection items, it is possible to display more selection items in a small space and display the selection items so as to be viewed easily.

Specifically, the controller 170 changes the number of the rows in which the selection items should be displayed, when the number of the selection items to be displayed under the selected menu item exceeds a predetermined number. In the example shown in FIG. 6, the selection items are displayed in one row under the selected menu item when the number of the selection items is 2 to 4. When the number of the selection items is 5 to 7, the selection items are displayed in two rows under the selected menu item. When the number of the selection items exceeds 7, they may be displayed in three or more rows. When the selection items are displayed in a plurality of rows, it is necessary to display the selection items not only under the selected menu item but also under the non-selected menu item located immediately right or immediately left of the selected menu item. If the selection items are displayed adjacent to the non-selected menu item, it is difficult for a user to understand instantaneously from which menu item these selection items are derived.

In contrast, in the present embodiment, when the selection items are displayed in two or more rows, a space of a size equivalent to at least a size of one icon is ensured under the menu item located immediately right or immediately left of the selected menu item, in order to avoid having the selection items belonging to the selected menu item displayed continuously under the menu item located immediately right or immediately left of the selected menu item. Describing with reference to FIG. 4C, the space with the size of the icon is provided under the menu item "C" to avoid the selection items B1 to B5 belonging to the selected menu item "B" from being displayed adjacent to the menu item "C" located immediately right of the menu item "B". This makes it possible to prevent the above-mentioned wrong recognition from occurring and lower the possibility of an operation mistake occurring.

When the state shifts from FIG. 4B to FIG. 4C, that is, when displaying the selection items B1 to B5 under the selected menu item "B", the process of displaying the selection items B1 to B5 may be animated imaginatively. For example, there can be considered a method in which the aspect ratios of the icons of the selection items B1 to B5 are changed stepwise from the state where the icons are shrunk in the longitudinal direction of the screen to a normal state, or a method in which the icons of the selection items B1 to B5 are displayed one after another sequentially. Thereby, a user can recognize more clearly the correspondence relationship between the selected menu item and the selection items belonging thereto. This is also the case when the state shifts from FIG. 5A to FIG. 5B.

The controller 170 displays the plurality of selection items belonging to the selected menu item by a pull-down method while displaying the selection item currently being set and the other one or more selection items in such a manner that this selection item can be distinguished from the other one or more selection items (S308). Specifically, there can be mentioned a method in which the selection item currently being set is displayed in a frame with a different color from that of frames of the other one or more selection items, and a method in which the selection item currently being set is colored differently from the other one or more selection items. More specifically, the selection item currently being set is highlighted in such a manner that this selection item can be distinguished from the other one or more selection items.

Subsequently, when a user touches one of the selection items displayed on the touch panel 182 (Yes in S309), the touch panel 182 transmits the positional information of the touched area to the controller 170 (S309). The controller 170 detects which selection item was touched, based on the positional information of the selection items displayed on the touch panel 182 and the positional information of the touched area transmitted from the touch panel 182. Then the controller 170 changes the display of the touched selection item (S310). As the method for changing the display, there can be mentioned a method in which the selected selection item is displayed in a frame with a different color from that used before the touching, and a method in which the selection item itself is displayed in a different color from that used before the touching. Also, the display of the selection item that was set before the touching is returned to the unset state. By using the different displays of the selection item between before and after the touching, it is possible for a user to see easily how the user has changed the selection item. When the selection item that already has been set is touched, it is not necessary to change the display of the selection item.

The controller 170 displays the selection items for a certain period, and then saves the content or the value of the selection item changed by the touching as the setting content or the setting value of the menu item (S311). Also, the controller 170 erases the display of the selection items from the touch panel 182 (S312). Thereafter, the controller 170 changes the touch panel 182 to the screen shown in FIG. 4A that had been used before the menu item was selected.

More specifically, when a user performs a setting operation using the selection items belonging to the selected menu item, the controller 170 executes a process of returning the display section automatically to an initial state in which the menu items are arranged and displayed in the lateral and longitudinal directions of the screen. This makes it unnecessary to force a user to perform a special operation of returning the display section to the initial screen (the state shown in FIG. 4A) in which the menu items are list-displayed. This contributes to the enhancement of the operativity and convenience of the video camera 101. Of course, it is possible to provide an icon for returning to the initial screen so that the process of returning the display section to the initial screen shown in FIG. 4A is performed in response to the touching of the icon.

The menu items A to L may indicate comprehensively the selection items belonging thereto. Alternatively, the menu items A to L may be indicated with the selection item currently being set. For example, any of the selection items B1 to B5 can be displayed as the menu item B.

Other Embodiments

So far, Embodiment 1 has been described as an embodiment of the present invention. However, the present invention is not limited to this. Other embodiments of the present invention are summarized in this section.

Embodiment 1 describes a configuration in which the touch panel 182 is used when selecting among the menu items. However, the present invention is not limited to this. Instead of the touch panel, the menu display device may have a liquid crystal display monitor and an operation section such as a cross key. Displaying the menu items in large sizes makes it easy for a user to recognize the content of each of the menu items. Under this condition, the user selects among the menu items using the operation section such as a cross key.

The one or more lines other than the line including the selected menu item are displayed behind the first line in Embodiment 1. However, the present invention is not limited to this. For example, erasing the one or more lines other than the line including the selected menu item also achieves the same effect. More specifically, when one of the menu items is selected by the touch panel 182 serving as the menu item selector, the controller 170 executes a process of erasing the one or more lines other than the line including the selected menu item from the screen.

In Embodiment 1, the menu items are displayed in three lines. However, the present invention is not limited to this. The menu items may be displayed in two lines, or four or more lines in accordance with the number of the menu items.

In Embodiment 1, the menu display device is applied to a video camera. However, the present invention is not limited to this. The menu display device of the present invention can be applied to an apparatus that needs to display many items to be selected, despite of the fact that the display size of its display section is relatively small. The menu display device of the present invention may be applied to a car navigation apparatus, etc., for example.

Figure 7:
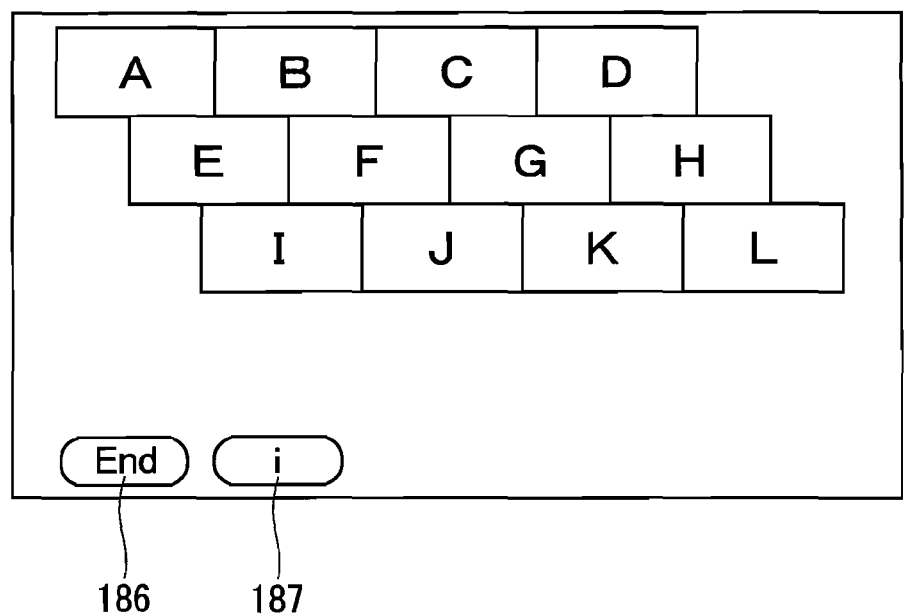
FIG. 7 shows an example of menu display according to a modified embodiment.

Moreover, it is possible to provide an information operation section for displaying a description about each of the menu items A to L displayed on the touch panel 182. Moreover, it is possible to provide an end operation section for ending the display of the menu items A to L. In the example shown in FIG. 7, icons 186 and 187 serving as the end operation section and the information operation section, respectively, are displayed on the touch panel 182. By touching the information icon 187 after selecting one of the menu items A to L, it is possible to display the description about the selected menu item. This information function allows a user to know easily the detailed content of each of the menu items even when the menu items A to L are indicated with simple icons. By touching the end icon 186, it is possible to erase the menu items A to L from the touch panel 182, and end the menu selecting function using the quick menu button 184a.

The menu display device of the present invention can display more items when displaying menu items, each having a large size, and their selection items on the display section. The menu display device is useful because it can be applied to imaging apparatuses, such as a digital video camera and a digital still camera, and car navigation apparatuses.

The present invention can be applied to other embodiments as long as they do not depart from the spirit and essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A menu display device comprising:
    a display section configured to display selectable menu items in a plurality of lines, each of the menu items being indicated with an icon having a frame in which a content of the menu item is described with a character, a graphic, a symbol, or these in combination, the frame having a specified shape and size;
    a menu item selector configured to select one of the menu items; and
    a control section configured to execute a control so that when the menu item is selected by the menu item selector, the plurality of lines are displayed overlapped with each other so as to hide the icons indicated in the one or more lines other than the line including the selected menu item, the line including the selected menu item is displayed at a forefront, and a selection item corresponding to the selected menu item is displayed under the selected menu item;
    wherein the display section displays the plurality of menu items indicating different contents from each other, the menu items being arranged in lateral and longitudinal directions of a screen so that a user can recognize all of the menu items visually;
    wherein when one of the menu items is selected by the menu item selector, the control section executes, using the display section, a display control including processes of:
        (i) displaying the plurality of menu items in the lines overlapped with each other in an upper area of the screen while displaying, at the forefront on the screen, the selected menu item together with the other one or more menu items included in the same line as the line of the selected menu item, so that the menu items included in the other one or more lines are interrupted by the selected menu item and the other one or more menu items included in the same line as the line of the selected menu item, and
        (ii) displaying a plurality of the selection items belonging to the selected menu item under the selected menu item so as to be associated with the selected menu item; and
    wherein when displaying the selection items under the selected menu item, the control section changes the number of lines and rows in which the selection items should be displayed, in accordance with the number of the selection items belonging to the selected menu item, and wherein when the number of selection items under the selected menu item is greater than a predefined number, the selection items are displayed in two or more rows.

2. The menu display device according to claim 1, wherein when the menu items are displayed in the plurality of lines on the display section, in order to allow display positions of the menu items included in one line to be staggered, with respect to the lateral direction of the screen, from display positions of the menu items included in another line adjacent to the one line, the icons composing the menu items included in the one line are displayed displaced from the icons composing the menu items included in the another line.

3. The menu display device according to claim 1, wherein:
when the line including the selected menu item is a line located uppermost with respect to the longitudinal direction of the screen, the menu items included in the other one or more lines are moved to an area where the menu items included in the other one or more lines are interrupted by the selected menu item and the other one or more menu items included in the same line as the line of the selected menu item, in the process (i); and
when the line including the selected menu item is not a line located uppermost with respect to the longitudinal direction of the screen, the selected menu item and the other one or more menu items included in the same line as the line of the selected menu item are moved to an area where the selected menu item and the other one or more menu items included in the same line as the line of the selected menu item interrupt the menu items included in the line located uppermost with respect to the longitudinal direction of the screen, in the process (i).

4. The menu display device according to claim 1, wherein each of the selection items is indicated with an icon having a frame in which a content of the selection item is described with a character, a graphic, a symbol, or these in combination, the frame having the same shape and the same size as those of the frame of the menu item; and
the process (ii) includes a process of displaying the selection items under the selected menu item by a pull-down method.

5. The menu display device according to claim 1, wherein:
each of the selection items is indicated with an icon having a frame in which a content of the selection item is described with a character, a graphic, a symbol, or these in combination, the frame having the same shape and the same size as those of the frame of the menu item;
the process (ii) includes a process of displaying the selection items under the selected menu item by a pull-down method; and
the control section serves to: (a) change the number of rows in which the selection items should be displayed when the number of the selection items to be displayed under the selected menu item exceeds a predetermined number; and (b) when the selection items are displayed in two or more rows, ensure a space of a size equivalent to at least a size of the icon under the menu item located immediately right or immediately left of the selected menu item, in order to avoid the selection items belonging to the selected menu item from being displayed continuously under the menu item located immediately right or immediately left of the selected menu item.

6. The menu display device according to claim 1, wherein when one of the menu items is selected by the menu item selector, the control section executes a process of (iii) erasing the one or more lines other than the line including the selected menu item from the screen, instead of the process (i).

7. The menu display device according to claim 1, wherein when a user performs a setting operation using the selection items belonging to the selected menu item, the control section executes a process of returning the display section automatically to an initial state in which the menu items are arranged and displayed in the lateral and longitudinal directions of the screen.

8. The menu display device according to claim 1, wherein the display section and the menu item selector are composed of a touch panel display that allows a user to select among the menu items and make settings for the selection items by touching the menu items and the selection items displayed on the display section.

9. An imaging apparatus comprising the menu display device according to claim 1, the imaging apparatus being operated in accordance with a content of a setting determined by a user using the menu display device.

10. A method for displaying a menu, comprising the steps of:
displaying selectable menu items in a plurality of lines on a display section, each of the menu items being indicated with an icon having a frame in which a content of the menu item is described with a character, a graphic, a symbol, or these in combination, the frame having a specified shape and size;
selecting one of the menu items; and
displaying the plurality of lines so as to be overlapped with each other so that the icons indicated in the one or more lines other than the line including the selected menu item are hidden, and displaying the line including the selected menu item at a forefront while displaying selection items corresponding to the selected menu item under the selected menu item, when one of the menu items is selected;
displaying in the display section the plurality of menu items indicating different contents from each other, the menu items being arranged in lateral and longitudinal directions of a screen so that a user can recognize all of the menu items visually;
the control section executing, when one of the menu items is selected by the menu item selector using the display section, a display control including processes of:
(i) displaying the plurality of menu items in the lines overlapped with each other in an upper area of the screen while displaying, at the forefront on the screen, the selected menu item together with the other one or more menu items included in the same line as the line of the selected menu item, so that the menu items included in the other one or more lines are interrupted by the selected menu item and the other one or more menu items included in the same line as the line of the selected menu item, and
(ii) displaying a plurality of the selection items belonging to the selected menu item under the selected menu item so as to be associated with the selected menu item;
when displaying the selection items under the selected menu item, the control section changing the number of lines and rows in which the selection items should be displayed, in accordance with the number of the selection items belonging to the selected menu item; and
displaying the selection items under the selected menu item in two or more rows when the number of selection items is greater than a predefined number.

11. The menu display device according to claim 1, wherein when displaying the selection items under the selected menu item, the control section changes the number of lines and rows in which the selection items should be displayed such that each selection item under the selected menu item is displayed, in accordance with the number of the selection items belonging to the selected menu item.

12. The method for displaying the menu according to claim 10, further comprising when displaying the selection items under the selected menu item, the control section changing the number of lines and rows in which the selection items should be displayed such that each selection item under the selected menu item is displayed, in accordance with the number of the selection items belonging to the selected menu item.

13. The menu display device according to claim 1, wherein when the selection items under the selected menu item are displayed in two or more rows, a space having a size equivalent to at least a size of one icon is provided under a menu item immediately adjacent to the selected menu item.

14. The method for displaying the menu according to claim 10, further comprising providing a space having a size equivalent to at least a size of one icon under a menu item immediately adjacent to the selected menu item when the selection items under the selected menu item are displayed in two or more rows.

* * * * *